INVENTOR.
GASTON DEVOS
BY nolte & nolte
ATTORNEYS

United States Patent Office

3,442,095
Patented May 6, 1969

---

3,442,095
UNIVERSAL JOINT
Gaston Devos, Paris, France, assignor to Lohr & Bromkamp G.m.b.H., Offenbach am Main, Germany
Filed Oct. 4, 1965, Ser. No. 492,391
Claims priority, application France, Oct. 8, 1964, 990,716; Mar. 16, 1965, 9,339
Int. Cl. F16d 3/30
U.S. Cl. 64—21        2 Claims The invention relates generally to homokinetic universal joints, and more particularly to constant velocity joints.

With constant velocity joints the torque is transmitted by balls, which are arranged between an inner and an outer joint member, in guide grooves thereof. In order to obtain a constant velocity in every angular position of the joint, the balls must be guided in such a way, that at each bending angle of the joint, the balls must be arranged in a so called constant velocity plane, that is, in a plane bisecting the angle of bending.

For keeping the balls always in the same plane, it is a known practice to keep the balls not only in guide grooves, but also in windows of a cage which is arranged between the two joint members. These windows are so constructed that the balls may move in a plane as defined by the cage radially and peripherally.

Already before the second World War it was known that there are several possibilities for positively guiding the balls in a constant velocity plane during bending of the joints. Three possibilities are described in U.S. Patent 2,046,584 (1936).

The first possibility consists of arranging the guide grooves in both joint members in such a way that the sides of the grooves guide the balls in the constant velocity plane. This possibility is widely used in the practice nowadays.

The second possibility consists of pivoting the cage always into the constant velocity plane by means of a separate guide face. However, this possibility requires relatively complicated construction of the joint by including additional construction elements.

The third possibility consists of forming the cage as a so-called offset-joint. From the above mentioned U.S. Patent 2,046,584, and also from U.S. Patent 1,975,758 such an offset-joint is known, wherein the cage is guided by an outer spherical face in a spherical inner face of the outer joint member, and by an inner spherical face in an outer spherical face of the inner joint member. For achieving the offset-effect which controls attainment of the constant velocity plane, the center point of the outer spherical face is symmetrically offset to one side of the joint center point, and the center point of the inner spherical face is symmetrically offset to the other side of the joint center point. In this embodiment, the wedge effect of the different thickness of the cage wall assumes the control of the guiding of the balls into the constant velocity plane. In order to obtain the desired control effect, a relatively thick cage is required. Thereby, the cage wall will become thin at one end thereof, due to its wedge shaped form. On account of these disadvantages of the offset-joints, only the first possibility finds substantially practical application and in accordance with which the balls are controlled by guide grooves. Occasionally the second possibility is used, wherein the balls are controlled by means of a separate control face.

Also before the end of World War II, it was known that a constant velocity joint could be constructed telescopically, so that the inner joint member is movable with respect to the outer joint member. Thereby, the outer spherical face to the cage is not guided in a spherical inner face of the outer joint member, as hitherto done in the constant velocity non-telescopic joints, but in a cylindrical surface in which the cage is movable axially of the cylindrical surface. Such a telescopic joint is described in U.S. Patent 2,309,939 (1943). In this known telescopic joint, the guide grooves for guiding the cage in a constant velocity plane extend spirally in accordance with the above-named first possibility, while the cage is formed as a uniformly narrow spherical shell.

After the second World War, much work has been done with respect to constant velocity telescopic joints, since they are of utmost importance, for instance, in drive shaft constructions in vehicles. For directing or guiding the cage into a constant velocity plane in the known telescopic joints, the above first mentioned guiding possibility of the cage, namely, by means of suitably shaped guide grooves as disclosed in U.S. Patent 2,309,-939, is basically employed.

An object of the invention is to provide an improved constant velocity joint free from the above-described shortcomings.

It is another object of the invention to provide a constant velocity joint of the telescopic type having an offset-cage and in which the outer joint member is formed with a cylindrical inner surface. Thereby, the inner cylindrical surface of the outer joint member can satisfactorily perform the required control of the offset-cage which has wedged shaped walls, a fact which heretofore has been obviously overlooked. Heretofore, it was believed that a spherical inner face of the outer joint member is always required for controlling the cage when using a constant velocity joint with an offset-cage.

The joint, according to the invention, has a special advantage in that the construction of the guide grooves is very simple. The guide grooves must be straight as the ones shown in FIG. 4 of U.S. Patent 2,046,584, since an arcuate arrangement of the grooves as shown in FIG. 2 of this U.S. patent, or according to U.S. Patent 1,975,-758, would not permit telescopic movement of the joint. The straight guide grooves may be arranged parallel with respect to the axis of the cylindrical inner surface of the outer joint member. In this case, the telescopic joint may be moved without a superimposed telescopic movement.

In another embodiment of the invention, the guide grooves may be arranged on a cylindrical surface in each joint member in a tangential fashion in skew inclinations which are oppositely directed in the two joint members. In this case, the guide grooves assist in guiding the cage by means of the balls into a constant velocity plane. Furthermore, the straight guide grooves are easy to manufacture.

For a better understanding of the invention, its operating advantages and the specific objects attained by its use, reference should be had to the accompanying drawings and descriptive matter in which.

Figure 1:
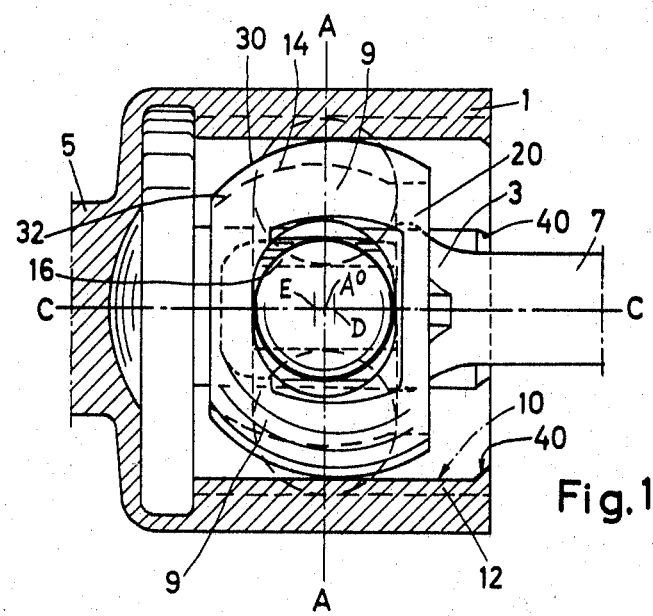
FIG. 1 shows an embodiment of the invention in a longitudinal view, partly in section, in which the section is taken along line 1—1 of FIG. 2.
Figure 2:
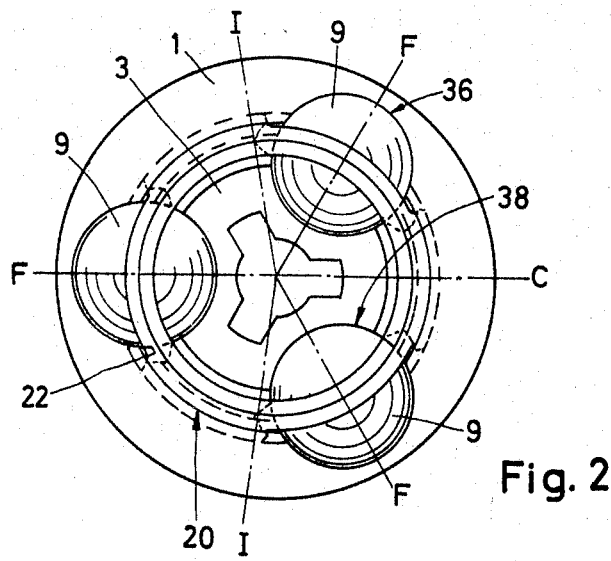
FIG. 2 is a front view of the embodiment of FIG. 1.
Figure 3:
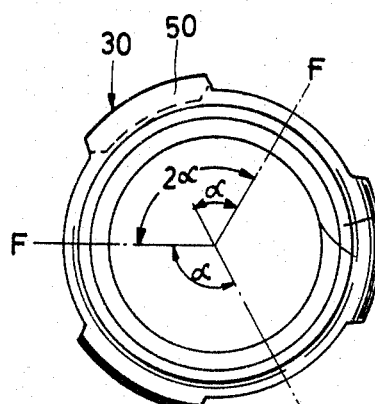
Figure 4:
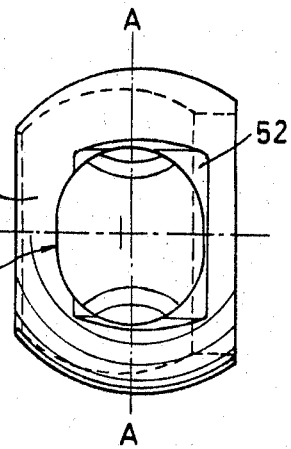
Figure 5:
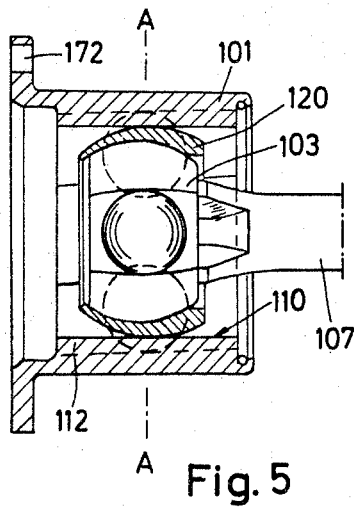
Figure 6:
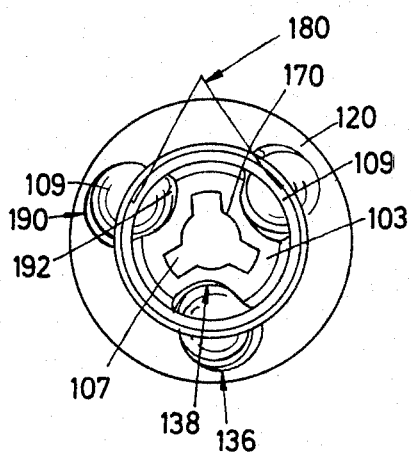

FIGS. 3 and 4 shows a cage of the embodiment of FIGS. 1 and 2, in a front view, and in a side view, respectively; and FIGS. 5 and 6 show another embodiment of the invention in longitudinal view partly in section and in a front view, respectively.

The joint shown in FIGS. 1 and 2 comprises an outer member 1 and an inner joint member 3. The outer joint member 1 consists of one piece having a shaft shank portion 5, shown in a fragmentary view, and the inner joint member 3 is fixedly connected to another shaft shank portion 7, by means of a spline connection. However, all joint members and the shaft, or shaft portions, may consist of individual construction elements which are interconnected with each other in a known manner.

The torque of the turning joint is transmitted between outer joint member 1 and inner joint member 3 by means of three balls 9. It should be noted, however, that any other number of balls could be provided. Balls 9 engage longitudinal grooves 12 provided on a cylindrical inner surface 10 of outer joint member 1, and also longitudinal grooves 16 provided on the spherical outer surface 14 of inner joint member 3. These longitudinal grooves extend along axis C—C of the elongated joint, that is, along the axis of outer joint member 1 and inner joint member 3.

The balls are held in a common plane in windows 18 of cage 20. Windows 18 have an elongated form, as can be seen in FIG. 2 at 22, and in FIG. 4, so that each ball 9 may be displaced peripherally of the cage within their associated windows 18. Besides, the balls may move radially while they are restrained in the longitudinal dimension of the cage.

Line A—A is a center plane which leads through the center point of the elongated joint. It can be seen in FIGS. 1 and 4 that spherical outer surface 30 of cage 20, which surface is guided in a cylindrical inner surface 10 of outer joint member 1, has a center point D which is symmetrically offset to the left with respect to the joint center point $A^0$ as can be seen in FIG. 1, while center point E of spherical inner face 32 of the cage, which is guided on the outer spherical surface 14 of inner joint 3, is symmetrically offset to the right by the same distance as center point D is offset to the left.

With this symmetrically offset construction, the cage will be automatically pivoted into the bisecting constant velocity plane of the bending angle during bending of the joint, whereby balls 9 are also automatically guided to a constant velocity plane.

In the embodiments shown, the guide grooves have a semi-cylindrical groove bottom 36 and 38 respectively. A shoulder 40 which extends inwardly of the outer joint member is located on one end of cylindrical inner surface 14 of the outer joint, which limits the sliding distance of the joint on this side. When a sliding to the other direction is performed, a similar limiting means is arranged at the outer joint member.

A certain difficulty may exist when assembling the joint. This will be carried out in the following manner:

First of all, cage 20 will be mounted onto inner joint member 3, and thereafter this unit is introduced into the cylindrical inner space of outer joint member 1. At that time, it is not possible to adjust the unit into an operative position, wherein windows 18 of the cage must be located opposite guide grooves 12 of the outer joint member. Instead, the unit consisting of the cage and the inner joint member are introduced in a rotated position into the cylindrical inner space of the outer joint member, the rotation corresponding to a half distance of the windows, so that webs 50 will be located between windows 18 of the cage opposite of guide grooves 12. This type of introduction is possible, because the cage is more recessed at its outside at the location of the windows at 52 as would follow only from the boring of the windows. After the introduction of the unit consisting of the cage and the inner joint member, it will be turned in such a way that the windows will be located opposite of the guide grooves. Thereafter, the balls are introduced into the two cooperating guide grooves and the respective windows under a maximum bending of the joint. For a closer explanation, three radii F are shown on which the balls and the windows, respectively, are arranged in the operative position of the joint. During introduction of the unit consisting of the cage and inner joint, this unit is held in an offset position about the bisecting angle formed by bisecting the angle 2 between two adjacent radii.

The embodiment shown in FIGS. 5 and 6 are similar to the embodiment of FIGS. 1 and 2, with the exception of the direction of the guide grooves of the joints. Of the essential corresponding construction elements, only the outer joint member 101, the inner joint member 103, the cage 120, the cylindrical inner surface 110 of the outer joint member 101, the three balls 109 and bottoms 136 and 138 of the guide grooves should be mentioned.

It is seen that inner joint member 103 is in spline connection with a shaft 107 at 170, so that the inner joint member, and the shaft or shaft portion, respectively, form one unit, similar to that shown in FIG. 2. Flange holes 172, which are not present in outer joint member 1 of FIG. 1, are provided in outer joint member 101 for mounting the outer joint member to a shaft, or any other rotatable construction element.

The essential difference of the embodiment shown in FIGS. 5 and 6 from that of FIGS. 1 and 2, consists, as already mentioned above, in the direction of guide grooves 112 of outer joint member 101, and the guide grooves of the inner joint member, which are represented by their bottom portions 138 and 136. As indicated by lines 180, these guide grooves do not extend parallel to the axis of the joint member, but in each joint member 101 and 103 at oppositely direct angles in a tangential fashion to a cylindrical surface.

It should be noted, that it would be advantageous in this case, not to form bottom portions 138 and 136 of the guide grooves semi-cylindrically, but to provide recesses 190 and 192 at one side thereof, so that the balls could only engage one side of the guide grooves.

Although the invention has been described with respect to specific embodiments thereof, it is not intended to be limited to such specific embodiments, but it should be defined by the scope of the appended claims.

What is claimed is:
1. A constant velocity joint comprising an inner and an outer member each having an axis, longitudinal grooves formed in said inner and outer members, balls guided in said grooves for transmitting torque between said inner and outer members, cage means having an axis and being disposed between said inner and outer members, a plurality of apertures formed in said cage means for retaining said balls therein in a plane normal to the axis of said cage means, the axes of said inner and outer members intersecting each other in said plane to define the center point of the joint, said cage means having an outer spherical surface cooperating with a cylindrical inner surface of said outer member, said cylindrical surface being concentric with the axis of said outer member, and an inner spherical surface cooperating with an outer spherical surface of said inner member, the center of said outer spherical surface of said inner member lying on the axis of said inner member, said outer and said inner spherical surfaces of said cage means each having a center, said last mentioned centers lying on the axis of said cage means on opposite sides of and being spaced equal distances from said plane.

2. A constant velocity joint according to claim 1, in which said longitudinal grooves in said inner member form equal but oppositely directed helix angles with the longitudinal grooves in said outer member.

References Cited

UNITED STATES PATENTS

| | | | |
|---|---|---|---|
| 1,975,758 | 10/1934 | Stuber | 64—21 |
| 2,046,584 | 7/1936 | Rzeppa | 64—21 |
| 2,911,805 | 11/1959 | Wildhaber | 64—21 |
| 3,162,026 | 12/1964 | Ritsema | 64—21 |
| 3,237,429 | 3/1966 | Henry-Biabaud | 64—21 |

H. C. COE, *Primary Examiner.*